S. J. LA MONTAINE & C. A. MONEY.
TAKE-UP MECHANISM.
APPLICATION FILED DEC. 17, 1917.
1,298,969.
Patented Apr. 1, 1919.
4 SHEETS—SHEET 2.
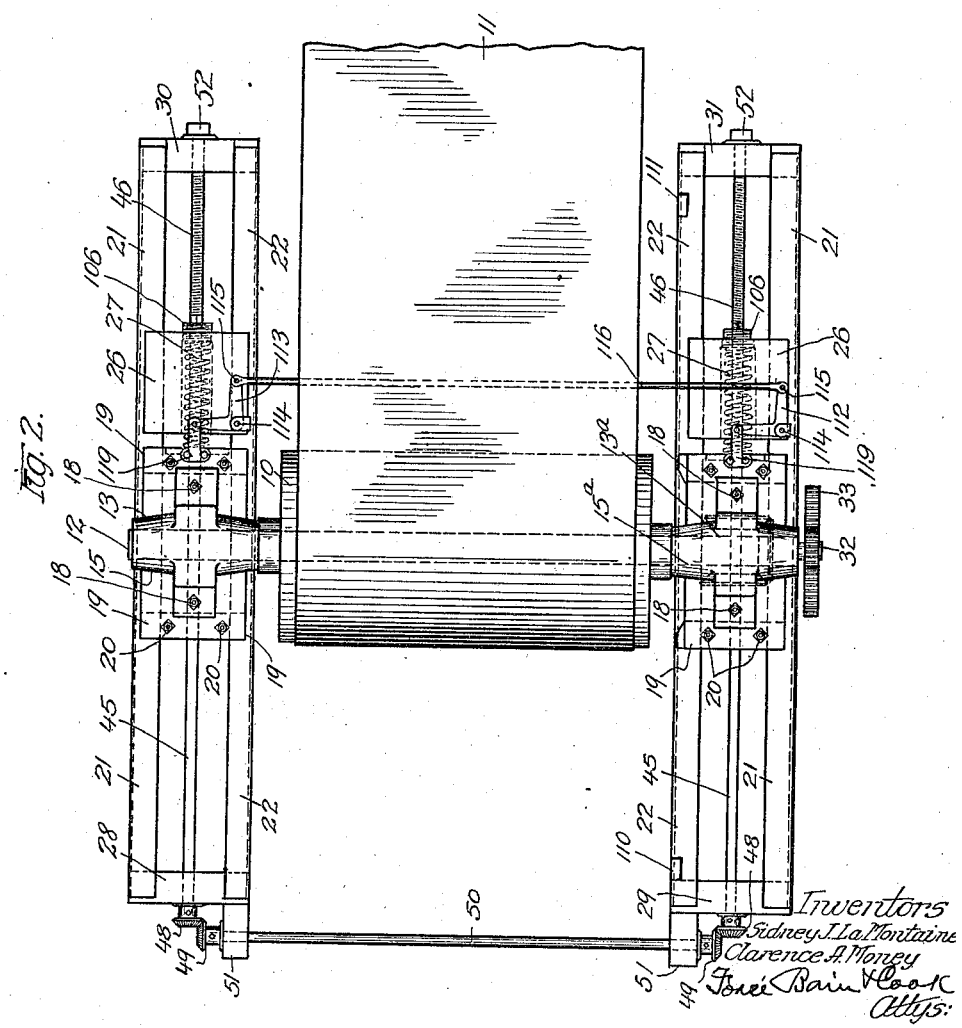

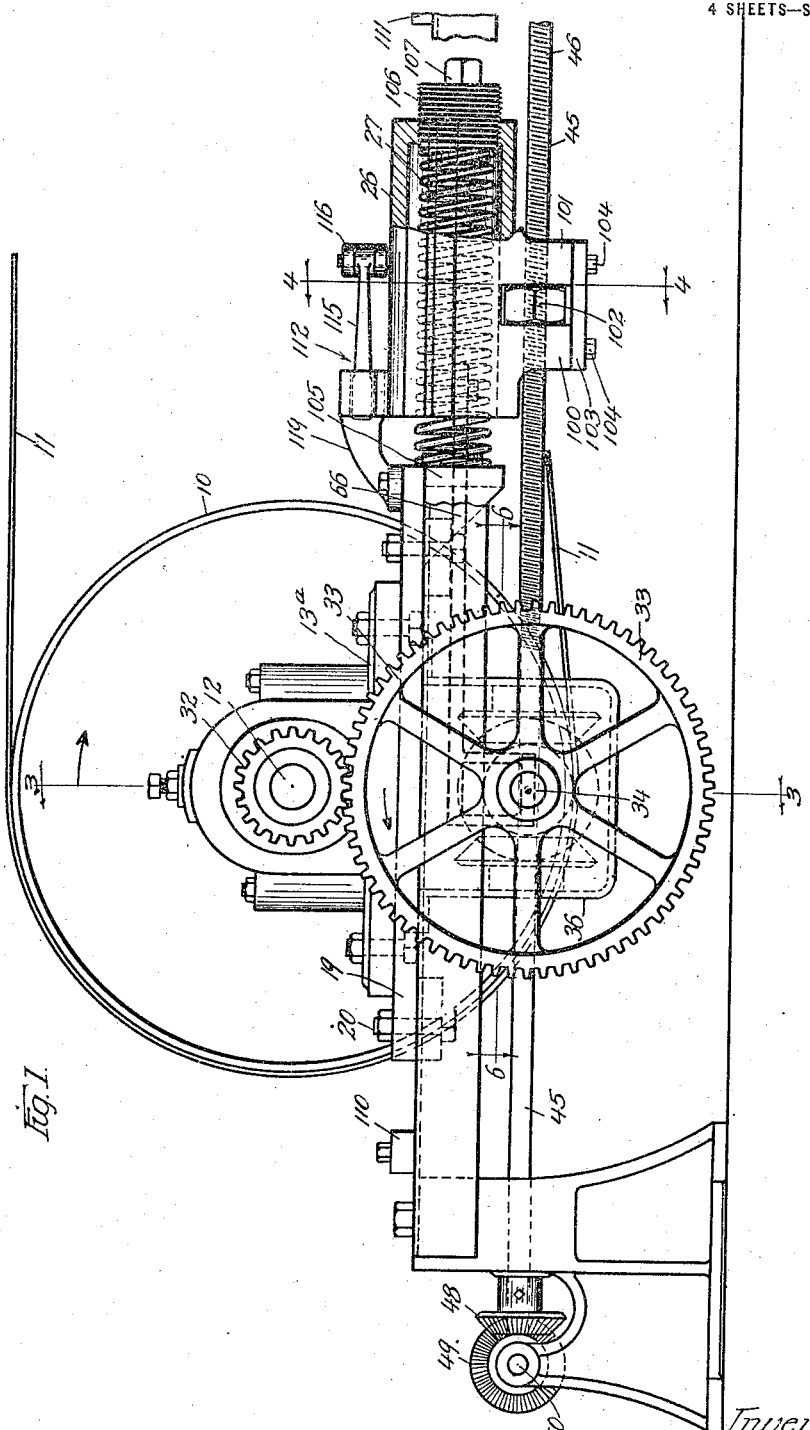

S. J. LA MONTAINE & C. A. MONEY.
TAKE-UP MECHANISM.
APPLICATION FILED DEC. 17, 1917.
1,298,969.
Patented Apr. 1, 1919.
4 SHEETS—SHEET 3.
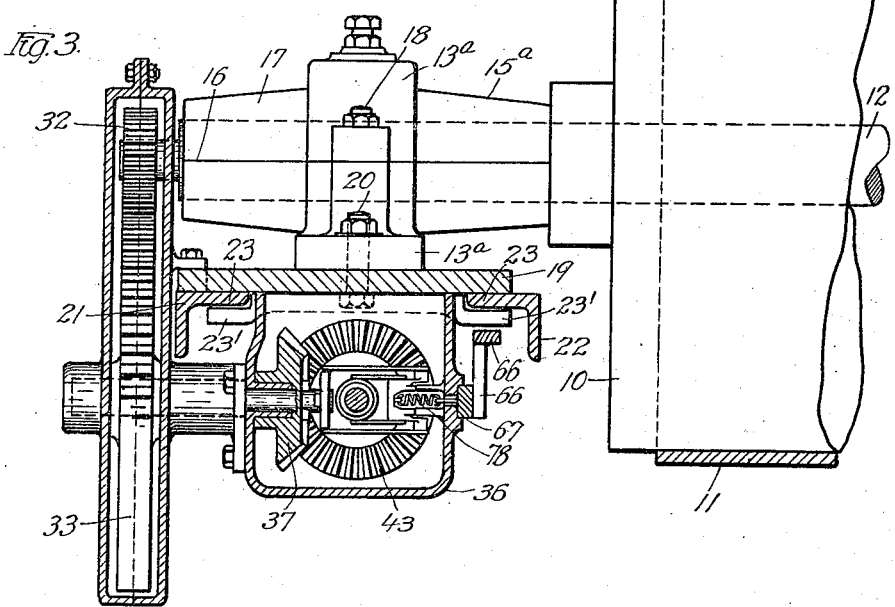
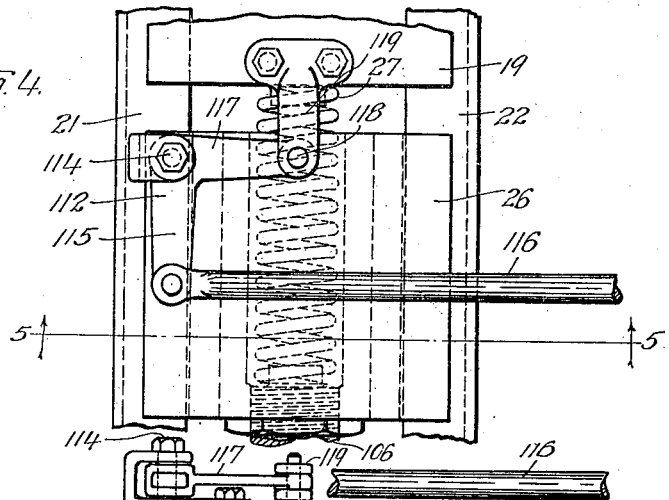
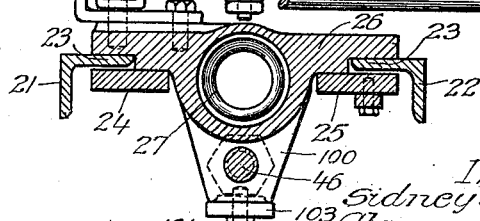

S. J. LA MONTAINE & C. A. MONEY.
TAKE-UP MECHANISM.
APPLICATION FILED DEC. 17, 1917.
1,298,969.
Patented Apr. 1, 1919.
4 SHEETS—SHEET 4.
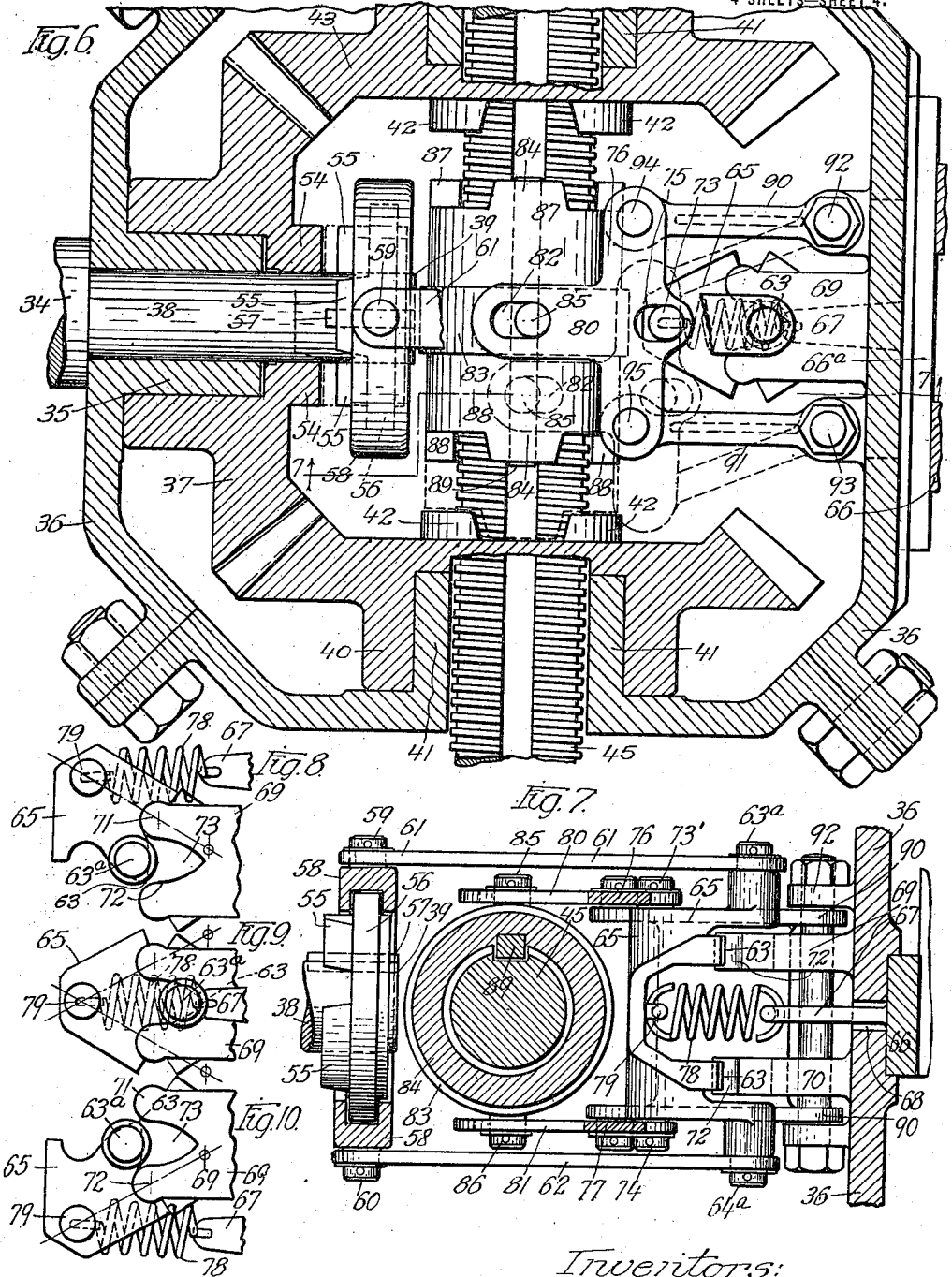
Inventors:
Sidney J. La Montaine
Clarence A. Money
Foree Bain & Cook
Attys.

UNITED STATES PATENT OFFICE.

SIDNEY J. LA MONTAINE AND CLARENCE A. MONEY, OF CHICAGO, ILLINOIS.

TAKE-UP MECHANISM.

1,298,969.

Specification of Letters Patent.

Patented Apr. 1, 1919.

Application filed December 17, 1917. Serial No. 207,574.

*To all whom it may concern:*

Be it known that we, SIDNEY J. LA MONTAINE and CLARENCE A. MONEY, citizens of the United States, and both residing at Chicago, in the county of Cook and State of Illinois, have invented certain new and useful Improvements in Take-Up Mechanisms, of which the following is a specification.

Our invention relates to improvements in take-up mechanisms.

One of the objects of our invention is to provide a mechanism which will automatically compensate for the expansion and contraction of belts, power transmission ropes, cables, conveyers, or the like, and maintain the tension thereon substantially constant to compensate for variations, expansion and contraction, and other conditions of operation.

Another, and more specific object of our invention is to provide means for moving the bearings of a shaft that supports a belt or the like, to automatically adjust their positions to compensate for abnormal expansion or contraction of the belt.

Other, further and more specific objects of our invention will become readily apparent to persons skilled in the art, from a consideration of the following description when taken in conjunction with the drawings, wherein:—

Figure 1 is a side elevation of a conveyer belt showing one pulley upon which it is mounted, and the automatic pulley moving mechanism in connection therewith.

Fig. 2 is a plan view of the same on a smaller scale.

Fig. 3 is a transverse section taken on line 3—3 of Fig. 1.

Fig. 4 is an enlarged plan view of a fragment showing a part of the equalizing mechanism.

Fig. 5 is a transverse section taken on line 5—5 of Fig. 4.

Fig. 6 is an enlarged section taken on line 6—6 of Fig. 1.

Fig. 7 is a section taken on line 7—7 of Fig. 6.

Figs. 8, 9 and 10 are enlarged plan views of the clutch moving mechanism in three positions, hereinafter more fully explained.

In all the views the same reference characters are employed to indicate similar parts.

In grain elevators and other places, large belts are frequently used for conveying grain, or other comminuted articles, from one place to another in substantially horizontal planes.

In other situations cables, ropes and belts are employed for transmission of power. In all such plants, it is essential that the tension on the moving transmitter shall be maintained substantially constant in order to preserve its tractive power. Therefore there must be some means employed to compensate for expansion and contraction of the transmitting belt, or rope, and other conditions of operation.

The extent to which a belt will elongate or contract in length, under varying conditions of work and weather, is considerable, and in many instances cables and ropes in power transmission plants are provided with tension, or take up pulleys, or sheaves, the bodily movement of which is necessarily large to compensate for the expansion or contraction due to various causes.

In relatively small plants one or more counterbalancing weights will serve as means for accomplishing the object sought to be effected by our invention, but in larger plants the cost of the counterbalancing weights and the fittings to support them is greater than the cost of our device, and furthermore the extra cost of the building or structural support to render them strong enough to bear the weight is greater and there are environments in which the space required for counterbalancing weight mechanism is not available.

Our take-up, or compensating mechanism, consists, briefly, of a pulley carrying a belt, or the like, supported upon a shaft having a bearing at each of its ends. A given normal tension to the belt is exerted by a spring located at each end of the shaft, and adapted to yieldingly maintain the shaft in its proper position so that the pulley, mounted thereon, will have the proper tractive effect upon the belt, rope or cable overrunning the pulley. The arrangement of the device is such that when the belt expands, tending to produce abnormal slack, the tension of the springs, to an extent, move the ends of the shaft forwardly in a direction to take up the slack. If the required movement is so great that it is not within the power of the springs to accomplish the desired effect, the relative movement of the two carriages, constituting parts of the mechanism, operate the clutch mechanism that connects the carriages to a source of power, and cause bodily movement of both carriages until the tension of the spring becomes normal and the slack of the belt is fully taken up. The effect of again compressing or tensioning the spring operates to restore the clutch to its normal inoperative position and shut off the power that causes the movement of the mechanism. Any undue tension of the belt, resulting from its contraction, or other cause, produces a movement of the two carriages in the opposite direction, effecting the same result, reducing the strain or stress of the springs to their normal tension. By this means the pulley, or sheave is always held yieldingly tensioned against the contacting surface of the overrunning belt, rope or cable, and any amount of slack or contraction may be easily and quickly compensated by the operation of the device.

In the exemplification which we have chosen as an embodiment for a clear disclosure of our invention 10 is a pulley upon which is mounted a conveyer belt 11. The pulley is fixed to the shaft 12 which finds bearing in pillow blocks 13 and 13$^a$. The sleeve bearings 15 and 15$^a$ are split along the line 16, the upper portion 17 being removable as the upper part of the pillow block 13 and being held in place by bolts 18. The pillow blocks 13, 13$^a$ are secured to a sliding plate or carriage 19, as by bolts 20. Slideways for guiding the plates 19, in their movement, are provided by the angle bars 21 and 22. The horizontal legs 23, of the angle bars, project laterally into slots made at the under side of the plate 19 by coöperation with a transversely extending bar 23' and by the plates 24 and 25 that extend only beneath the carriage 26, from which the open helical spring 27 extends.

Standards 28 and 29 support the forward ends of the guide bars 21 and 22, and standards 30 and 31 support the rear ends of the guide bars 21 and 22. The pinion 32, is in driving relation with a relatively large gear wheel 33, fixed to the shaft 34 which has a bearing 35 in a housing 36 and may be clutched to a beveled gear wheel 37. The shaft 34 is reduced in size, as at 38, and extends to the point 39 inside of the housing. A beveled gear wheel 40 has bearing on a hub 41 and is constantly in mesh with the gear wheel 37, loose on the hub 41 and on its inner surface carries a plurality of clutch members 42. A similar gear wheel 43, is constantly in mesh with and driven at times by the gear wheel 37 and has bearing on a similar hub 41 of the housing 36. It also has clutch members 42. The gear wheels 40 and 43 are coaxially arranged with an axially splined shaft 45.

The device is provided with two parallel shafts 45—45 which are screw threaded on their rear ends, as at 46—46, and which are each provided with a beveled gear wheel 48—48 on its forward end, in mesh with a gear wheel 49—49 on a transversely extending shaft 50. The shaft 50 has bearings 51—51 in the standards 28 and 29. There is only one housing 36 and its inclosed mechanism, for driving the shafts 45—45, and that is on the side where the gear wheels 32 and 33 are located.

The rear screw threaded ends 46, of the shaft 45, find bearings in the standards 30 and 31, respectively. A nut or collar 52, in conjunction with the beveled gear wheels 48 prevents axial movement of the shaft 45.

The bevel gear wheel 37, which drives the gear wheels 40 and 43, is provided with clutch members 54 for coöperative driving relation with clutch members 55 that are provided upon rotatable clutch member 56, which is slidable upon the end 39 of the shaft 38, and driven by the key 57. The annular clutch-moving member 56 is rotatable in an annular guide 58. The guide member 58 is pivoted, as at 59 and 60 to parallel links 61 and 62, respectively, and these links are pivoted at their other ends, as at 63$^a$ and 64$^a$, to a clutch moving frame 65 which has a quick snap action at a critical point.

Projecting forwardly from the carriage 26 is a bar 66 provided with an arm 67 that projects toward the shaft 45, through an elongated slot 68 made in the housing 36.

Projecting inwardly from the housing 36, on either side of the arm 67 are two bifurcated pocket arms 69 and 70. These arms are provided with prongs or projections 71 and 72, between which is a pocket or slot 73. The clutch-operating snapping member 65, which serves to quickly operate the clutch members 55 into engagement, or out of engagement with clutch members 54, is provided with projecting studs 73' and 74, on either side, that pass through elongated slots 75 in cross bars 76 and 77. A helical extension spring 78, is connected to the inwardly projecting arm 67 and to the clutch operating member 65, as at 79. Each of the cross bars 76—77 is provided with a centrally disposed, inwardly projecting arm, 80, 81, respectively, in the ends of which there are relatively elongated slots 82.

A ring 83 is rotatably loose in a groove in the clutch member 84 and is provided with radially projecting studs 85 and 86. The clutch member 84 is rotatable with and slidable on the screw shaft 45 and is provided with clutch engaging members 87 on one end, for engagement with the clutch members 42, of the gear wheel 43, and with clutch members 88 for engagement with the clutch members 42 of the beveled gear wheel 40, on the other end. The clutch member 84 is provided with a feather 89 slidable in the spline of the shaft 45 to provide driving relation therewith.

Two pairs of parallel links 90 and 91 are pivoted as at 92 and 93, respectively, to the housing 36. The other ends of these links are pivoted to the cross bars 76 and 77, as at 94 and 95, respectively, to give parallel motion to the cross bars 76—77.

The link 61 is pivotally connected, as at 59, to the clutch shifting member 58 and the clutch actuating member 65, as at 63ª, and the link 62 is similarly connected to these two members, as at 60 and 64ª, so as to axially move the clutch member 55, with respect to the shaft 34, while the actuating member 65 takes any of the three positions shown in Figs. 8, 9 and 10.

Projecting downwardly and centrally of the carriage 26, are two arms 100 and 101, leaving a space therebetween for a nut 102, which is adjustable upon the screw threaded ends 46—46 of the shafts 45—45. A plate 103 overlies the nut and is secured to the arms 100 and 101 by cap screws 104. This plate prevents the nut from turning, after it has been adjusted into its desired position. The nuts may be adjusted to vary the locations of the carriages on the respective screws to shift the ends of the shaft 12 with respect to the belt 11.

An open helical compression spring 27, is contained within each of the carriages 26—26, and abuts against the shoulders 105—105 carried by the carriages 19—19. A screw threaded plug 106, substantially as large as the spring 27 or slightly larger, is the means for adjusting the tension or stress to be normally exerted by the respective springs. The ends are provided with rectangular projections 107 for the purpose. There is a spring 27 on each side of the belt, as shown. By making the plug 106 of a size equal to or larger than the diameter of the spring 27, the latter may be readily removed for repairs or inspection and as readily replaced. The tension of, or stress exerted by, the two springs should be sufficient, or greater, than the tension of the belt 11 on the pulley 10. In other words, the two open helical compression springs 27, normally exert a tension or stress to force the carriages 19—19 away from the carriages 26—26 and by this means slight variation in the expansion or contraction of the belt may be compensated. When larger movements are required, for accomplishing this purpose, the entire mechanism, including the shaft, bearings and pulley, is moved, the desired distance, along the guide ways 21 and 22. The movement is continued until the normal tension of the spring is restored.

The operation of the device is substantially as follows:—

Should the tension of the belt 11 become abnormally great, due to its contraction, resulting from temperature, or conditions of the weather, or otherwise, the springs 27 will thereby be abnormally compressed, reducing the distances between the carriages 26 and the carriages 19, thereby changing the relation of the projection 67 with respect to the clutch snapper 65. This will result in the part 67 moving rearwardly,—or in a direction away from the front end, as for example where the shaft 50 is located—with respect to the part 67 which is fixed to the carriage 26, to the respective positions shown in Fig. 8. The result of this movement is that the clutch moving mechanism 65 will be fulcrumed on the points 71 and the angular projections 63 will be moved out of the slot or pocket 73 by the quick snap action of the spring 78 when it is moved beyond the plane containing the pivotal points 79, 71 and 67. This operates the clutch member 55 with a quick snap action. The movement of the member 65 quickly moves the links 61 and 62, axially of the shaft 34, and causes the clutch members 54 and 55 to be engaged. At the same time the clutch 84 will be moved, axially of the shaft 45, until the clutch members 87 engage the clutch members 42 of the beveled gear wheel 43, thus connecting this wheel, through clutch 84, with the shaft 45. This will rotate the screw 45, in the nut 102, and cause the carriage 26, the spring 27 and the carriage 19 to be moved rearwardly until the tension or stress exerted by the springs 27, is reduced to its normal value, whereupon the parts will then assume the positions shown in Fig. 9. This disengages the clutch members 54 and 55 and stops rotation of the screws 45. The parts will then occupy the positions shown in full lines in Fig. 6. A similar position, to which the members have been shifted, in the manner heretofore described to rotate the shaft 45, is shown in dotted lines in this figure. The movement of the clutch member 84 was, however, toward the gear wheel 43.

Should the tension of the belt become abnormally slack, by its elongation, then the clutch shifting mechanism will operate in the opposite direction, as shown in Fig. 10 and by dotted lines in Fig. 6, causing the clutch member 84 to engage clutch members 42 of the gear wheel 40, whereupon the screw 45 will be rotated in the opposite direction, to that of the former example, until the tension of the springs 27 become normal.

The safety stops 110 and 111 are placed on each end of the angle bar 22 so that should the mechanism be moved too far in either direction, these stops will automatically engage the carriage 19 and prevent the mechanism from jamming the end standards. Either of these stops will engage the carriage 19 and automatically restore the clutch operating mechanism to its normal position, shown in Fig. 9, so that these fixed stops 110 and 111 will serve as safety means to prevent the mechanism from shifting too far in either direction.

The springs 27 may be adjusted to train the belt by taking off the plate 103 and turning either of the nuts 102 until the desired movement of the shaft ends has been effected by each of the springs, after which the plates 103 may be replaced and thereby the nuts 102 will be held against unintentional or accidental rotation.

Means for equalizing the effect of the spring 27 is provided by the bell cranks 112 and 113, which are pivoted, as at 114, 114, respectively, to the respective carriages 26—26. The axially extending ends 115 of the bell cranks are pivotally connected to a transversely extending rod 116.

The transversely extending arms 117, of the bell cranks, are each pivotally connected, as at 118, to an arm 119, that is fixed to and projects from the carriage 19. By this means the tensions of the two springs 27 is equalized upon the two carriages 19, and the bearings of the shaft are always equally moved, regardless of any difference in the friction of carriages 19, 19 on the ways 21 and 22.

While we have shown a single embodiment of our invention for the purpose of a clear disclosure, it is manifest that changes may be made in the character and location of the parts within the scope of the appended claims.

Having described our invention, what we claim is:—

1. A device of the character described comprising a pulley or sheave; an overrunning belt or cable; yielding means for exerting a given limited tension of the belt in contact with the pulley and automatic means for bodily moving said belt, when the tension becomes subnormal or abnormal, due to the expansion or contraction of the belt, respectively, and reëstablishing the tension.

2. A device of the character described comprising a pulley or sheave; a shaft on which said pulley is mounted having movable bearings at each end; a belt or cable overrunning said belt; yielding means for exerting a normal tension of the belt in its contact with the pulley, operating uniformly on said bearings, and automatic means for bodily and coextensively moving said bearings when the tension becomes subnormal or abnormal, due to the expansion or contraction of the belt, respectively, until the normal tension of the yielding means is reëstablished.

3. A device of the character described comprising a pulley; a belt in contact with the pulley; a shaft upon which the pulley is mounted; a bearing at each end of the shaft; two movable carriages upon which the bearings are mounted, respectively; another carriage; a spring between the first mentioned carriage and the latter carriage to exert tension on the belt and means for automatically moving said carriages when the tension of the spring becomes subnormal or abnormal by expansion or contraction of the belt, respectively, and reëstablishing the normal tension of the spring.

4. A device of the character described comprising a shaft; a bearing at each end of said shaft; ways upon which said bearings are moved; a carriage to which power is applied to move the bearings; a spring carried by the carriage through which, when under tension, to transmit power to said bearings; a means to move the carriage, and means operable by variation of tension of said spring for controlling said power means.

5. A device of the character described comprising a shaft; a bearing at each end of the said shaft; a pulley mounted upon the shaft; ways upon which the respective bearing is bodily movable; a carriage to which power is applied to move the respective bearings; a spring carried by said carriage, through which, when under tension, to transmit power to the respective bearings; means to move said carriage and means, operable by variation of tension of said spring for controlling said carriage-moving means.

6. A device of the character described comprising a shaft; a bearing at each end of said shaft; a pulley mounted upon the shaft; ways upon which the respective bearing is bodily movable; a carriage to which power is applied to move the respective bearings; a spring carried by said carriage through which, when under tension, to transmit power to the respective bearings; means for equalizing the movement of the bearings under all conditions of operation; means to move said carriage, and means, operable by variation of tension of said spring for controlling said carriage-moving means.

In testimony whereof we hereunto set our hands.

SIDNEY J. LA MONTAINE.
CLARENCE A. MONEY.